| United States Patent [19] | [11] Patent Number: 4,497,541 |
| Okamura | [45] Date of Patent: * Feb. 5, 1985 |

[54] REAR VIEWER FOR AUTOMOBILE

[76] Inventor: Makoto Okamura, No. 1567-4, Sakata, Okegawa City, Japan

[*] Notice: The portion of the term of this patent subsequent to Jun. 23, 1998 has been disclaimed.

[21] Appl. No.: 355,489

[22] Filed: Mar. 8, 1982

[30] Foreign Application Priority Data

Mar. 17, 1981 [JP] Japan .............................. 56-37194[U]

[51] Int. Cl.³ .......................... G02B 5/08; G02B 5/10
[52] U.S. Cl. .................................... 350/626; 350/632; 350/602
[58] Field of Search ........................ 350/301, 302, 307

[56] References Cited

U.S. PATENT DOCUMENTS 1,844,437  2/1932  Paxton ................................. 350/302
1,844,438  2/1932  Paxton ................................. 350/302
4,274,714  6/1981  Okamura ............................ 350/452

Primary Examiner—John K. Corbin
Assistant Examiner—Richard F. Gallivan
Attorney, Agent, or Firm—Ladas & Parry

[57] ABSTRACT

A rear viewer for automobile is disclosed which enables an automobile driver to see and ascertain condition at road immediate behind and below rear end portion of his automobile by an uninverted state of image whereby the automobile driver can instantly understand the condition of the road immediate behind and below the rear end portion of the automobile to safely and correctly drive the automobile backwardly in all weather conditions.

3 Claims, 7 Drawing Figures

FIG_2
PRIOR ART 4,497,541

REAR VIEWER FOR AUTOMOBILE

BACKGROUND OF THE INVENTION

The present invention relates to a rear viewer for automobile which enables an automobile driver to see condition at a road immediate behind and below rear end portion of his automobile.

Heretofore, the inventor has invented and filed various rear viewers for automobile. An example thereof is a rear viewer as shown in FIG. 1 wherein a holder frame box 2 of a triangular cross section has a thin plate-like Fresnel concave lens F mounted on an opening at its under side, a flat plate-like reflex mirrow $M_1$ mounted on inner side of its inclined roof and a front side having an opening. The holder frame box 2 is bonded on the outer surface of a rear window glass of an automobile at the front side of the holder frame box 2 (as shown in U.S. Pat. No. 4,274,714). Another example is a rear viewer as shown in FIG. 2 wherein a holder frame box 2 has an inserted and bonded transparent plate having a surface of a plate-like prism P and an opposite surface of a plate-like Fresnel concave lens surface F at inclined opening on rear edge of the holder frame box 2 and the front edge of the holder frame box 2 is bonded on an outer surface of a rear window glass 1 of an automobile (as shown in Japanese Utility Model Application Laid Open Publication No. 28,041/82). Thirdly, FIG. 3 shows an example of conventional rear viewers wherein peripheral edge of a convex reflex mirror $M_3$ is bonded on a holder plate H which adjustably holds a tip ball of a support arm T protruded from an attaching hole on rear upper portion of an automobile body B.

The above three examples of conventional rear viewer will be scrutinized from optical view points as follows. In the rear viewer shown in FIG. 1, condition at a road over a desired distance from a point b immediate behind and below the rear end portion of the automobile to a point a of a desired rearward distance (as shown by an arrow from point b to point a) is reflected by the plate-like reflex mirror $M_1$ through the plate-like Fresnel concave lens F to the automobile driver to give an invert state of image at the road as shown by an arrow from a point b″ to a point a″. Namely, the automobile driver has to see the point b immediate behind and below the rear end portion of his automobile as an upper position and the rearward point b as a lower position, so that the automobile driver has to see condition at a road immediate behind and below the rear end portion of the automobile by only an invert state of image (refer to FIG. 7).

In the rear viewer shown in FIG. 2, angle of depression Q of the lens is 60° with respect to horizontal line. At the present stage of technique, angle of depression Q of a lens is about 60° at the maximum due to various optical restrictions such as material of the lens and shape of the lens etc. Thus, the part from a point b to a point c corresponding to an angle S, i.e., 30° with respect to the vertical line, can not be seen by the automobile driver at all. As a result, the automobile driver can not see or ascertain condition at a road immediate behind and below the rear end portion of the automobile, even though he can see the part behind the point b as a normal state of image.

In the rear viewer shown in FIG. 3, condition at a road immediate behind and below rear end portion of an automobile can be seen at any rate by the automobile driver as an invert state of image similarly as in FIG. 1. However, since the rear viewer of this type gives a reflected image by means of a convex mirror, the automobile driver can see only a distorted image and the rear end portion of the automobile has to be bored for receiving an arm which supports the rear viewer. That is, as shown in FIG. 3, since the rear window is disposed to outer air atmosphere and the mirror is provided at the position apart from said rear window and projected outwardly, there is a disadvantage that the rear window has to provide at least one of defroster and rear wiper, etc., even though said mirror is provided toward downward direction. These are a further disadvantage in addition to the former disadvantageous optical property.

SUMMARY OF THE INVENTION

The present invention obviates the above-mentioned drawbacks of conventional rear viewers.

An object of the present invention is to provide a rear viewer for automobile which enables an automobile driver to see and ascertain rearward condition at a road easily, quickly and correctly at all weather condition such as rain or snow, and which enables the automobile driver to see without distortion a condition at a road immediate behind and below the automobile rear end portion, and which enables the automobile driver to see condition at a road immediate below and behind rear end portion of an automobile as a normal state of image.

Another object of the present invention is to provide a rear viewer for automobile comprising, a holder frame box, a sealed type box-like retaining chamber formed in the holder frame box, a front side opening provided at front side of the holder frame box, an under side opening provided at the under side of the holder frame box, a thin plate-like Fresnel concave lens mounted on the under side opening, the front side of the holder frame box being attachable on to the outer surface of rear window glass of the automobile, a first reflex mirror retained in said chamber for showing a condition at a road over a range of from approximate immediate behind and below rear end portion of the automobile to a desired range behind the rear end portion of the automobile through said thin plate-like Fresnel concave lens and a second reflex mirror retained in said chamber and arranged oppositely to the first reflex mirror for enabling the automobile driver to see the condition at the road reflected to the first reflex mirror as a normal state of image.

Other objects and advantages of the present invention may be appreciated by referring to the following description and claims, taken in conjunction with the accompanying drawings.

Figure 1:
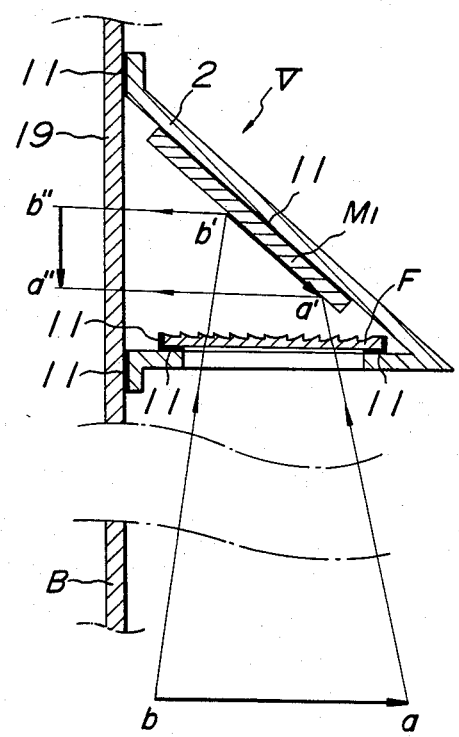
FIGS. 1–3 are schematic longitudinal cross-sectional view of conventional rear viewers taken along the longitudinal direction of an automobile body.
Figure 2:
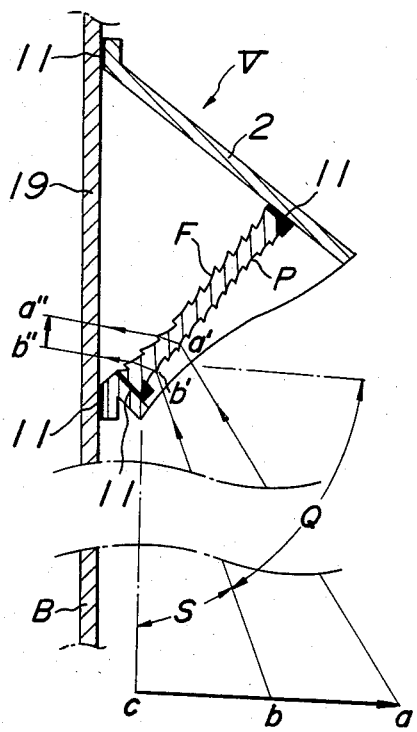
Figure 3:
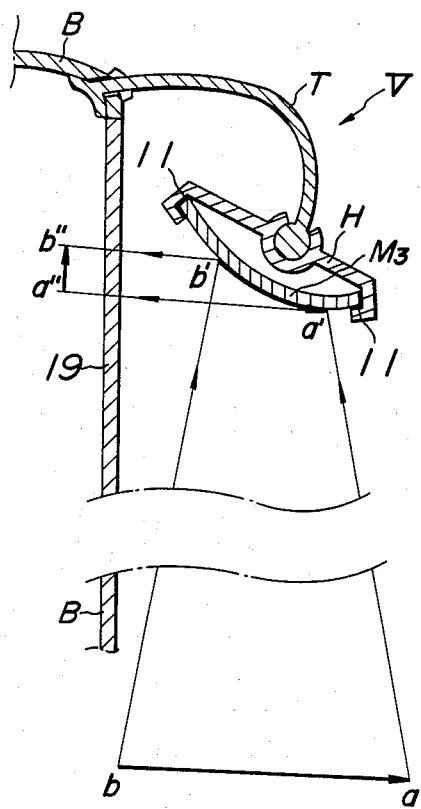

In the drawings, referential numerals represent the followings.

1 ... holder frame box, 2 ... rear wall of holder frame box 1, 3 ... sidewall of the holder frame box 2, 4 ... box-like holding chamber, 5 ... rotatable axis, 6 ... exgernally treaded portion, 7 ... knob, 8 ... fixing nut, 9 and 10 ... flanges, 11 ... bonded portion, 12 ... small hole or holes, 13 and 14 ... arrows showing rotational direction of the reflex mirror, 15 ... opening at under side, 17 ... opening at front side, 19 ... automobile rear window glass, B ... rear end portion of automobile body, C ... crossing passenger, D ... driver of next automobile, F ... thin plate-like Fresnel concave lens, H ... holder plate, K and M ... arrows showing direction of movement of an automobile in question, $M_1$ and $M_2$ ... plate-like reflex mirror, P ... plate-like prism, Q ... angle of depression, R ... rear end portion of an automobile in question, S ... angle of inclination, T ... supporting arm, U ... next automobile, V ... rear viewer

DETAILED EXPLANATION OF THE INVENTION

The present invention will be explained in more detail with reference to FIGS. 4 and 5.

Figure 5:
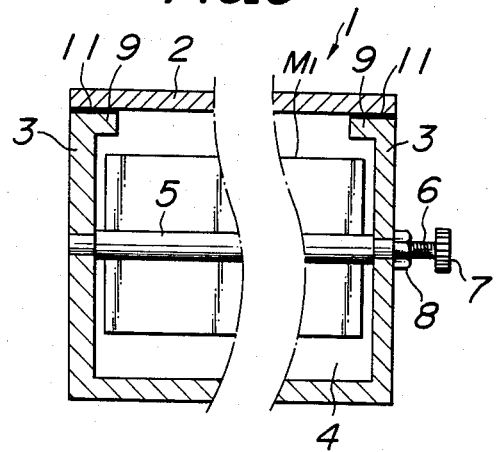
FIG. 5 is a partial horizontal cross-sectional view thereof taken along the line A—A of FIG. 4 and its central portion being omitted in the drawing for clarification.

Reference numeral 1 is a holder frame box which has an arc-like rear wall 2 and side walls 3, 3 which close the both side of the rear wall 2 as shown in FIG. 5.

Underside of the holder frame box 1 has an opening 15 surrounded by peripheral flanges 10, 10 of the holder frame box 1. The peripheral flanges 10, 10 of the holder frame box 1 support a thin plate-like Fresnel concave lens F on the opening 15. Peripheral edge of the Fresnel concave lens F rests on the peripheral flanges 10, 10 and bonded by an adhesive at bonding portions 11, 11. An opening 17 and a peripheral flange 9 surrounding the opening 17 are provided in the front side of the holder frame box 1. The peripheral flange 9 is bonded to an appropriate part of an automobile rear window glass 19 by an adhesive at bonding portions 11, 11 so as to form a sealed type box-like holding chamber 4.

In the holding chamber 4, plate-like reflex mirrors $M_1$, $M_2$ are holded in such a fashion that they face to each other. Both reflex mirrors $M_1$, $M_2$ have horizontal axises 5, 5 fixed at their back side in a lateral width direction of the automobile. Both ends of the horizontal axises 5, 5 are rotatably supported on the side walls 3, 3. One end of the horizontal axis 5 of the mirror $M_1$ is protruded outwardly from the side wall 3 and externally threaded to form a threaded portion 6. The threaded portion 6 has a mating fixing nut 8 for fixing the horizontal axis 5 on the side wall 3, and has a fixed knob 7 at its end. The other mirror $M_2$ has a structure same as that of the mirror $M_2$. The both reflex mirrors $M_1$, $M_2$ can change their inclination angles with respect to each other properly by rotating the knobs 7, 7 in a direction as shown by arrows 13 and 14.

Since the rear viewer of the present invention has the structure as mentioned above, condition at a road immediate behind and below the rear end portion of the automobile as shown by an arrow of from a point b' to a point a' is converged as a length of from a point b to a point a in the first plate-like reflex mirror $M_1$ through a Fresnel concave lens F and is reflected to the second plate-like reflex mirror $M_2$ as a length of from b" to a point a" and reflected by the second reflex mirror $M_2$ to give the automobile driver a figure as shown by an arrow of from a point b''' to a point a'''. Thus, the automobile driver can see the condition at the immediate behind and below the rear end portion of his automobile as a normal state of image. Namely, the automobile driver can see the point b near the automobile body B as a lower position and the position a distant from the automobile body B as an upper position (refer to FIG. 6).

For adapting the rear viewer of the present invention to the height of an automobile driver's eyes, the knob 7 of the rotatable axis 5 of the first reflex mirror $M_1$ is rotated in a direction of an arrow 13 or an arrow 14 to adjust the inclination angle of the mirror $M_1$ and subsequently the rotatable axis 5 of the reflex mirror $M_1$ is fixed on the side wall 3 by means of the fixing nut 8.

Figure 7:
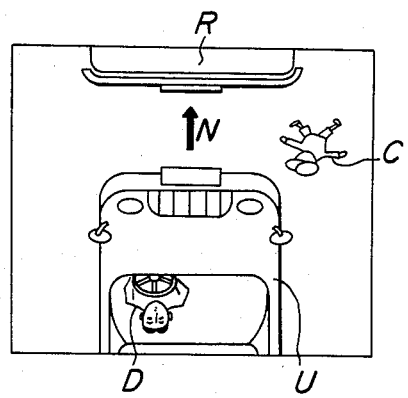
FIG. 7 is a rear view seen by a conventional rear viewer of FIG. 1.

When driving an automobile having a conventional rear viewer backwardly, an automobile driver has to see condition at a road over a desired length immediate behind and below the rear end portion of the automobile as an invert state of image as illustrated in FIG. 7. Thus, when a conventional rear viewer which has to see backward or rear condition at a road as an invert state of image is used for driving an automobile backwardly, the rear end portion R of the automobile going backward is seen as if it moves downwardly, a next automobile U is seen as if it moves upwardly as shown by an arrow N, a next automobile having a right-sided handle is seen as an automobile having a left-sided handle and a cross passenger C showing his left side is seen as if his right side is shown. Therefore, the automobile driver receives an extremely extraordinary impression when he sees and ascertains condition at a road and feels much difficulty in driving his automobile backwardly and can never attain easy, quick and correct judgement and handling and results in sometimes car crush or car accident.

Figure 6:
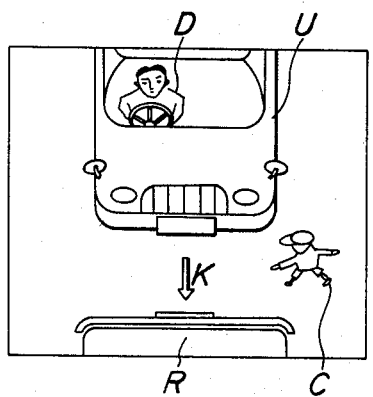
FIG. 6 is a rear view seen by a rear viewer of the present invention when an automobile driver is going to drive his car backwardly.

In contrast, if the rear viewer of the present invention is used, an automobile driver can see and ascertain condition at a road as a natural or normal state of image as illustrated in FIG. 6. Namely, the rear end portion R of the automobile driver's automobile is seen to move upwardly, a next automobile U is seen to move dowanwardly as shown by an arrow K, the next automobile U having a right-handed handle can be seen as it is, a cross passenger C show his left side as actually he does. Therefore, the automobile driver can see and ascertain the condition at the road immediate below and behind his automobile easily, quickly and correctly by the normal state of image without feeling an extraordinary impression and can drive his automobile quite easily, quickly and correctly and a car accident due to sudden illusion can be eliminated.

The rear viewer according to the present invention has many practical advantages. For example, it can be used without hindrance against weathery changes such as falling snow or rain etc., because the holder frame box forms a sealed type holding chamber. In addition, it can be attached to an automobile body simply by means of an adhesive without a necessity of boring the automobile body. Moreover, it is right in weight and simple in structure and there is no afraid of its breakage. Furthermore, it can be produced cheaply.

In operating the rear viewer of the present invention, a plate-like reflex mirror $M_2$ can be adjustably rotated instead of rotating the mirror $M_1$, or both of the mirrors $M_1$ and $M_2$ can be adjustably rotated.

Figure 4:
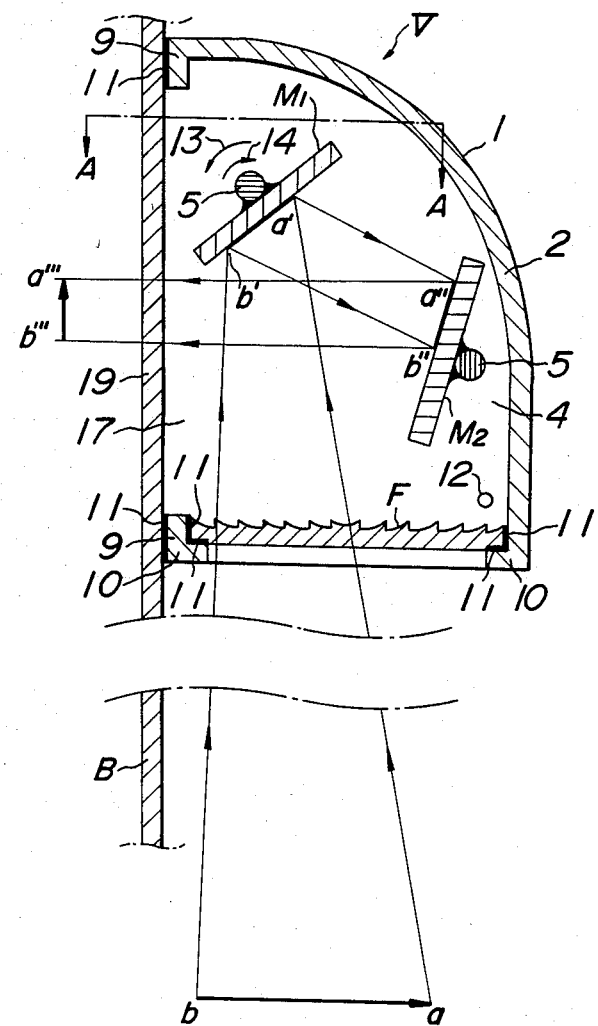
FIG. 4 is a schematic longitudinal cross-sectional view of the rear viewer of the present invention taken along the longitudinal direction of an automobile body.

In a modification of the rear viewer of the present invention, at least one small hole 12 as shown in FIG. 4 is provided at an appropriate point of a side wall surface, in order to prevent peeling-off of the adhesive from the bonding portion due to expansion of air in the sealed type holding chamber resulting from temperature increase in the holding chamber.

In further modification of the present invention, a portion of whole of a thin plate-like Fresnel concave lens and/or plate-like reflex mirrors can be made of a synthetic resin, and at least one of the reflex mirrors can be made of a metal plate, and the holder frame box can be made of a synthetic resin material or a light metal or alloy such as aluminum or titanium alloy.

Although the invention has been described in detail with reference to specific embodiments, it is understood that the present disclosure has been made only by way of example and that numerous changes in details of construction and combination and arrangement of parts may be resorted to without departing from the scope of the invention as hereinafter claimed.

What is claimed is:

1. A rear viewer for automobile comprising, a holder frame box; a sealed type box-like retaining chamber formed in the holder frame box; a front side opening provided at front side of the holder frame box; an under side opening provided at an under side of the holder frame box; a thin plate-like Fresnel concave lens mounted on said under side opening; the front side of the holder frame box being attachable onto the outer surface of an automobile rear window glass; a first reflex mirror adjustably retained in said chamber for showing the road condition in an area from approximately immediately below a rear end portion of the automobile to a desired area behind the rear end portion of the automobile through said thin plate-like Fresnel concave lens, and a second reflex mirror adjustably retained in said chamber and arranged oppositely to the first reflex mirror for enabling the automobile driver to see the condition at the road reflected by the first reflex mirror, whereby the automobile driver can see the road condition transmitted by said plate-like Fresnel concave lens, the first reflex mirror and the second reflex mirrors as an uninverted image.

2. A rear viewer for automobile as defined in claim 1, wherein either one of the opposing two reflex mirrors is adjustably rotatable around a horizontal axis extending in lateral width direction of the automobile.

3. A rear viewer for automobile as defined in claim 1, wherein both of the opposing two reflex mirrors are adjustably rotatable independently with respect to each other around a horizontal axis extending in lateral width direction of said holder frame box.

* * * * *